United States Patent [19]

Johnson

[11] 4,127,802
[45] Nov. 28, 1978

[54] HIGH TORQUE STEPPING MOTOR

[76] Inventor: Milton H. Johnson, 13022 Maxwell Rd., Cypress, Tex. 77429

[21] Appl. No.: 785,193

[22] Filed: Apr. 6, 1977

[51] Int. Cl.² .............................................. H02K 37/00
[52] U.S. Cl. ...................................... 318/696; 310/156; 310/114; 310/49 R
[58] Field of Search ............... 318/696, 685, 259, 138; 310/49, 162–165, 156, 112, 114, 126

[56] References Cited

U.S. PATENT DOCUMENTS

| | | | |
|---|---|---|---|
| 2,774,922 | 12/1956 | Thomas | 310/49 |
| 3,204,136 | 8/1965 | Kaiwa et al. | 310/49 |
| 3,293,460 | 12/1966 | Iwai et al. | 310/164 X |
| 3,327,191 | 6/1967 | Goto | 310/49 X |
| 3,401,322 | 9/1968 | O'Regan | 310/49 X |
| 3,411,059 | 11/1968 | Kaiwa | 310/49 X |
| 3,462,667 | 8/1969 | Jackson | 318/138 |
| 3,483,406 | 12/1969 | Inaba et al. | 310/49 |
| 3,513,341 | 5/1970 | Gratzmuller | 310/156 |
| 3,553,511 | 1/1971 | Hemmings et al. | 310/156 |
| 3,777,196 | 12/1973 | Field | 310/156 |
| 3,849,682 | 11/1974 | Binns | 310/156 |
| 3,992,641 | 11/1976 | Heinrich et al. | 310/114 X |

*Primary Examiner*—Donovan F. Duggan
*Attorney, Agent, or Firm*—Arnold, White & Durkee

[57] ABSTRACT

The invention provides a high torque bidirectional stepping motor. Toothed rotor and stator assemblies having pole pieces sandwiching annular permanent magnets and solenoid coils, respectively, are disclosed. Pulsing means for activating the motor are also disclosed. Adjacent rotor assemblies are misaligned in disclosed fashion to provide fractional notch stepping in response to sequential control pulses from the pulsing means.

5 Claims, 9 Drawing Figures

HIGH TORQUE STEPPING MOTOR

BACKGROUND OF THE INVENTION

My invention relates to a high torque bidirectional stepping motor with non-energized detent torque. Previously available stepping motors possess unacceptably high weight to torque ratios, and their complexity of structure makes them unfeasibly expensive to manufacture.

One of the main features of my invention, therefore, is the provision of a high torque stepping motor that is simple in structure and easy to manufacture.

Another feature of my invention is the provision of slot apertures in the rotor and stator assemblies of my motor so as to further reduce the weight of the motor while increasing reluctance to non-radial flux paths and to reduce power loss from eddy current formation.

Further features of my invention are the provision of appropriate circuits to provide sequential stepping of the motor with half-wave AC pulses and to provide continuous stepping using an angular position sensing device to route continuously control pulses to the motor.

My invention also provides a motor which may be used in combination with suitable power transmission means to engage with the drive train of a vehicle such as an automobile.

These features and other advantages of my invention will be apparent to persons skilled in this art from reading the specification and the claims appended hereto.

SUMMARY OF THE INVENTION

I have devised a high torque bidirectional stepping motor having at least three rotor assemblies firmly coaxially affixed to a non-magnetic shaft with non-magnetic spacers separating adjacent rotor assemblies. Each rotor assembly comprises a thin annular, or washer-like, permanent magnet surrounding the shaft and two identical disc-like rotor pole pieces sandwiching the permanent magnet. The teeth on the rotor pole pieces project above the surface of the permanent magnet and may be aligned with each other. Each rotor assembly is surrounded by a stator assembly corresponding thereto, which comprises a pair of spaced identical disc-like stator pole pieces having inwardly projecting teeth equal the number to the teeth on the corresponding rotor pole pieces. The stator pole piece teeth are complementary in shape to the teeth on the rotor pole pieces, and the teeth on all stator pole pieces used in the motor are aligned with the teeth on the corresponding rotor pole pieces. Between each pair of stator pole pieces in each stator assembly is a solenoid coil around which runs a stator cap bounding the outer surface of the solenoid coil. The rotor pole pieces, stator pole pieces and stator caps are made from a high induction material suitable for use in electric motors. Adjacent rotor assemblies, and their corresponding stator assemblies, are angularly displaced from each other. My invention also provides pulsing means to energize each coil in a predetermined sequence, so that rotation in either direction may be produced.

BRIEF DESCRIPTION OF THE DRAWINGS

FIG. 7 is a schematic diagram of the AC pulsing circuit used in the basic switching format of FIG. 5.

FIG. 8 is a schematic diagram of a sensing circuit used in lieu of the clock shown in FIG. 7.

FIG. 9 is an enlarged view of FIG. 8 showing the placement of the Hall effect sensor in the rotor-stator assembly of a motor constructed in accordance with my invention.

DESCRIPTION OF THE PREFERRED EMBODIMENTS

Figure 1:
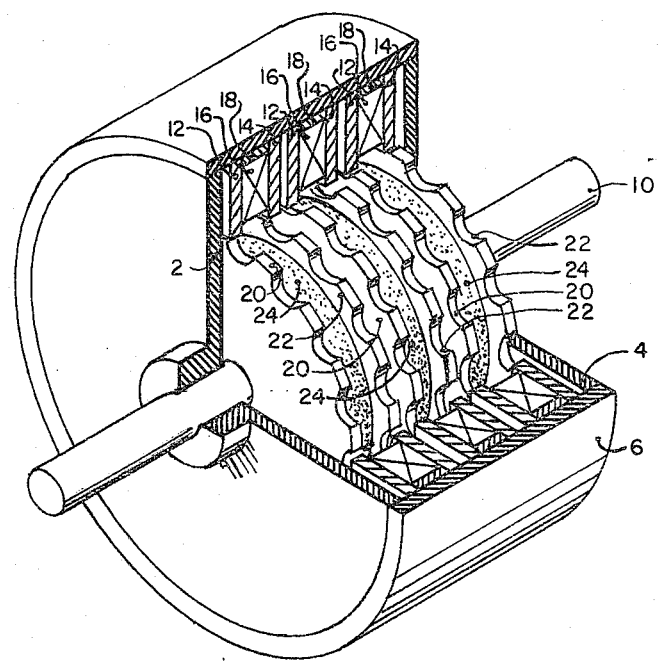
FIG. 1 is a partially cut away isometric view of a motor in accordance with my invention.
Figure 2:
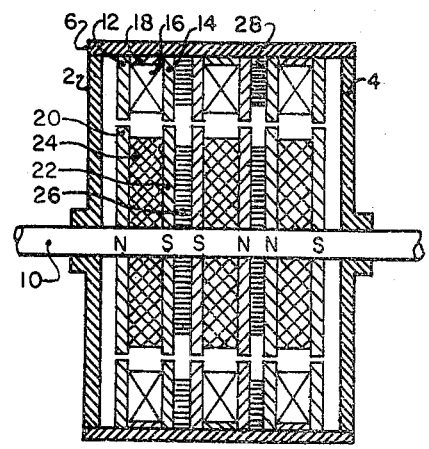
FIG. 2 is a longitudinal cross section of the motor of FIG. 1 through the center of the shaft.
Figure 3:
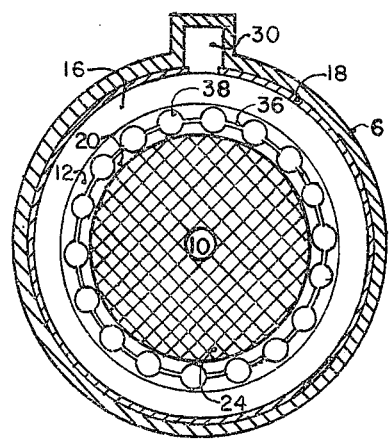
FIG. 3 is an end view of the motor of FIG. 1 with the end plate 2 removed.

FIG. 1 depicts an embodiment of my invention which uses three rotor assemblies and three stator assemblies arranged concentrically about shaft 10. The motor is encased by end plates 2 and 4 and outer shell 6. Shaft 10 is a non-magnetic material sufficiently strong for heavy-duty use. Each rotor assembly in the motor comprises rotor pole pieces 20 and 22 and a thin annular permanent magnet 24 sandwiched between rotor pole pieces 20 and 22. The permanent magnet 24 is preferably in the form of a washer or disc of a magnetic material having a high coercive force, such as barium ferrite, Alnico 8 or 9, or cobalt rare earth composition. I prefer to use as thin a permanent magnet 24 as possible to minimize the reluctance of the permanent magnet to the passage of the magnetic flux paths through it as a proportion of the reluctance of the working air gap between the rotor and stator assemblies. Providing a thin permanent magnet 24 minimizes the ampere turns required for a given flux density in the air gap, thus increasing the amount of stepping torque available at any given input power. The magnetic field of the permanent magnet 24 is aligned parallel to the axis of the shaft 10, so that each of the rotor pole pieces 20 and 22 is a north or south magnetic pole. As shown on FIG. 2, adjacent rotor assemblies are aligned to place pole pieces of like magnetic polarity adjacent. This reduces flux leakage. Around the circumference of each rotor pole piece are formed a plurality of teeth 36 (shown on FIG. 3) formed by providing notches 38 (shown on FIG. 3) thereon. The teeth are preferably uniform in shape, the notches being provided at regular intervals around the circumference of each rotor pole piece. Between each rotor assembly employed in the motor is a spacer 26 (shown in FIG. 2) of a non-magnetic material.

The rotor pole pieces 20 and 22 are fabricated from high induction material suitable for use in electric motors. Although my preferred embodiment as depicted in FIG. 1 has three rotor assemblies, it is possible to increase the detent torque provided by motors constructed in accordance with my invention by increasing the number of coaxially mounted rotor assemblies (and their corresponding stator assemblies) until the desired performance is achieved.

Each stator assembly comprises two stator pole pieces 12 and 14 of magnetically "soft" high induction material sandwiched about a solenoid coil 16 which is wound perpendicularly to the axis of the shaft 10. Each solenoid coil 16 is energized by lead wires passing to each coil through wire harness receptacle 30 (shown in FIG. 3). The solenoid coil 16 in each stator assembly is bounded about its periphery by a stator cap 18 of a magnetically soft high induction material. The outer shell 6 of the motor may also act as a stator cap for more than one stator assembly. The stator caps 18 reduce flux leakage from the stator windings by providing a low reluctance path for the magnetic flux around them. Each stator pole piece is provided with the same number of teeth as is provided on each rotor pole piece corresponding to it. The teeth are preferably of the same configuration as the teeth on the rotor pole pieces, and they project inwardly toward the rotor pole pieces above the interior surface of the solenoid coil 16. Each pair of adjacent stator assemblies is separated by a nonmagnetic spacer 28 (depicted on FIG. 2) which performs the same magnetic function performed by the rotor spacer 26 by increasing the reluctance between adjacent rotor and stator assemblies.

As shown in FIG. 1, motors constructed in accordance with my invention having three rotor assemblies provide fractional notch stepping by having each rotor pole piece in adjacent rotor assemblies misaligned from the pole piece nearest it in the adjacent rotor assembly by a predetermined angle which is equal to 120 divided by $n$ degrees, where "$n$" is the number of teeth on each rotor pole piece. As can be seen, misalignment of adjacent rotor assemblies in accordance with this formula will produce a motor which will step one-third of the angle between adjacent teeth on any given rotor pole piece in response to one control pulse. The amount of fractional notch stepping may be varied by changing the angle of misalignment. The general formula applicable to all motors for the angle of misalignment is 360 divided by the product of $n$ times $p$ degrees, where "$p$" is the number of stator assemblies. It is also possible to construct a motor with a multiple of $p$ stator assemblies by ganging each group of $p$ rotor and stator assemblies along the same shaft 10. Although not depicted on the drawings, the teeth on the stator assemblies must always be aligned throughout the length of the motor, or fractional notch stepping will not take place.

Figure 4:
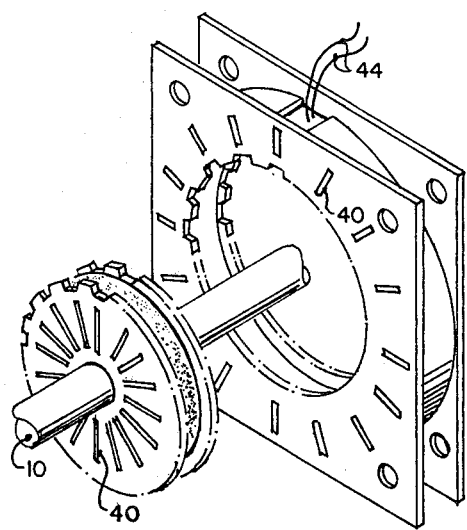
FIG. 4 is an exploded isometric view of a rotor assembly and stator assembly using substantially rectangular slots in the rotor and the stator pole pieces.

FIG. 4 illustrates an alternate embodiment of my invention, in which the pole pieces of each rotor and stator assembly are provided with substantially rectangular slot apertures 40, preferably one slot for each tooth of each rotor and stator pole piece, that are aligned along radii from the center of the shaft 10 through the apices of the teeth. As aligned, the slot apertures 40 run parallel to the flux paths through the rotor and stator pole pieces, increasing the reluctance of the magnetically coupled corresponding rotor and stator assemblies to non-radial flux paths and thereby reducing iron losses from eddy current formation during operation of the motor. The slots further reduce the weight of the motor.

Figure 5:
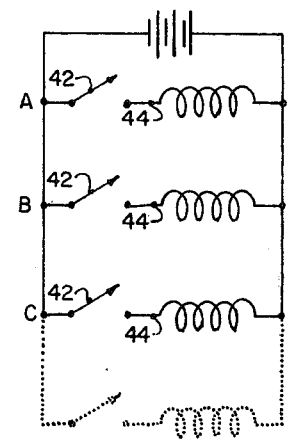
FIG. 5 is a schematic of the basic switching format employed in motors constructed in accordance with my invention.

FIG. 5 depicts in rough schematic form a switching format suitable for sequentially energizing the solenoid coils 16. Bidirectional rotation is provided by actuating the switching means 42 in predetermined sequence, A-B-C-A producing rotation in the one direction and A-C-B-A in the other. Lead wires 44 are connected sequentially to the solenoid coils in the stator assemblies along the length of the motor through receptacle 30. The switching means 42 (which I also call the pulsing means) may be a manually operated sequential relay circuit, or electronic means for feeding control pulses in sequence to the solenoid coils. The pulses are always of the same polarity regardless of the direction of rotation, which simplifies the design of the pulsing means considerably. Without being limited to the electronic means disclosed, since persons skilled in the art will readily arrive at other circuits to perform the same function, I have found that stepping in response to an AC source, be it single phase or multiphase, may be produced by proper sequential routing of half-wave pulses to the solenoid coils. Continuous stepping, in which mode my motor operates similarly to a DC motor, can be produced by using angular position sensing devices, such as optical or Hall effect sensors, to provide instantaneous control pulse sequencing to the solenoid coils.

Figure 6:
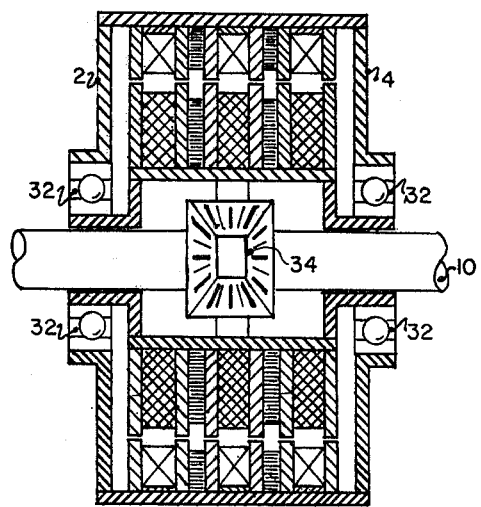
FIG. 6 depicts a motor in accordance with my invention cut away to show a differential mounted within the motor.

FIG. 6 shows in diagrammatic form my invention in one of its preferred uses, in combination with shaft bearings 32 and differential 34, to provide power to a vehicular drive shaft. Vehicular applications require a high power-to-cost ratio, which my invention satisfies for several reasons. First, the use of magnetically soft pole pieces and stator caps in the disclosed configurations provides a low reluctance path for magnetic flux through the rotor and stator assemblies, and thus minimizes flux leakage. Accordingly, energy losses from hysteresis and eddy currents, which detract from detent torque, are reduced. Since each rotor and stator assembly is on a 33% duty cycle, losses are further reduced from those observed in conventional electric motors. Second, the simplicity of my invention, which does not require complex rotor or stator windings, which would use expensive tooling, results in low manufacturing cost. The rotor and stator pole pieces can be stamped out in quantity and the remaining parts are simple and few in number. Labor costs can be minimized by constructing my motor in pancake fashion to any desired size.

FIG. 7 shows a conventional AC pulsing circuit to be used in providing fractional stepping of the motor. Power is supplied to the circuit by AC power supply 46. The switching circuit 48 may comprise silicon control rectifiers, relays or the like. Pulses are sequentially routed to the switching circuits 48 by the control circuit 50, which is a conventional digital control circuit such as a shift register, ring counter or the like. The control circuit 50 is regulated by clock 52, which provides pulses to the control circuit 50 at regular intervals which may be selected by the user of motors constructed in accordance with my invention to provide motor speeds appropriate for the use to which the motor is put. FIG. 8 depicts a three rotor motor in accordance with my invention having a central shaft 10 and three rotors 22. Solenoid coil 16 is depicted schematically as a single turn of wire. The circuit is activated by a power source 54, which may be either AC or DC, and switching is provided by conventional switching circuits 48 which correspond to the switching circuits 48 shown in FIG. 7. Likewise, control circuit 50 in FIG. 8 is the same as control circuit 50 in FIG. 7. FIG. 9 shows the placement of Hall effect sensors 56 close to the surface of each rotor 22 so that changes in the magnetic field in the rotor-stator gap as the motor rotates will cause the Hall effect sensors 56 to emit sequential pulses to control circuit 50, thereby activating switching means 48 to deliver pulses to the solenoid coils 16 of the motor.

FIG. 9 shows the placement of a Hall effect sensor 56 on the tooth of a stator assembly facing rotor tooth 36.

The foregoing description of the invention has been directed to particular embodiments in accordance with the requirements of the Patent Act and for purposes of explanation and illustration. It will be apparent, however, to those skilled in the art that many modifications and changes may be made without departing from the scope and spirit of my invention. For example, it is obvious that modifications in the disclosed embodiments of my invention necessary to satisfy the needs of any particular application, whether in scaling the motor up or down in size, or in providing special pulsing means, or in using materials chosen for that application, are well within the state of the art. It is my intention in the following claims to cover all such equivalent modifications and variations as fall within the true scope and spirit of my invention.

What is claimed is:

1. A high torque bidirectional stepping motor, comprising:
   a non-magnetic shaft;
   at least three rotor assemblies firmly affixed coaxially to said shaft with non-magnetic spacers between adjacent rotor assemblies, said rotor assemblies each comprising
      a thin annular permanent magnet surrounding the shaft with its magnetic polarity aligned parallel to the axis of the shaft,
      a pair of identical disk-like rotor pole pieces of high induction magnetic material having a plurality of uniform teeth around the circumference of each rotor pole piece, one of said rotor pole pieces being disposed on each face of said permanent magnet, wherein the teeth in said rotor pole piece project above the surface of said permanent magnet;
   at least three stator assemblies corresponding to the rotor assemblies, with non-magnetic spacers between adjacent stator assemblies, each of which stator assemblies comprises
      a pair of spaced identical stator pole pieces of magnetically soft high induction material having inwardly projecting teeth equal in number to the teeth on the corresponding rotor pole pieces and complementary in shape to the teeth on said rotor pole pieces, wherein the teeth of each stator pole piece are aligned with the teeth of each corresponding rotor pole piece,
      a solenoid coil disposed between said stator pole pieces, and
      a stator cap comprising a ring of magnetically soft high induction material bounding the outer surface of the solenoid coil;
   and pulsing means to energize each solenoid coil in a predetermined sequence;
      wherein the permanent magnets in the rotor assemblies are oriented so that like magnetic poles face one another,
      and wherein each rotor assembly is rotationally misaligned from the adjacent rotor assembly such that each tooth in the one rotor assembly is displaced from the corresponding tooth in the nearest pole piece in the adjacent rotor assembly by an angle equal to $(360/N_xP)$ degrees, where "N" is the number of teeth on each rotor pole piece and "P" is the number of stator assemblies employed in the motor.

2. The motor of claim 1, in which each rotor assembly is rotationally misaligned from the adjacent rotor assembly and each tooth in the one rotor assembly is displaced from the corresponding tooth in the nearest rotor pole piece in the adjacent rotor assembly by an angle equal to $(120/N)$ degrees.

3. The motor of claim 1, in which each rotor pole piece and stator pole piece is provided with substantially rectangular slot aperatures in the body of each said piece oriented along radii extending from the center of the shaft through the apices of the teeth in each rotor pole piece and stator pole piece.

4. The motor of claim 1, in which the pulsing means is an appropriate circuit activated by alternating current which sequentially routes half-wave control pulses to each of said solenoid coils.

5. The motor of claim 1, in which the pulsing means employs an angular position sensing device to route control pulses sequentially to each of said solenoid coils.

* * * * *